United States Patent Office 2,971,882
Patented Feb. 14, 1961

2,971,882

DIMETHYL-1,2-DIBROMO-2,2 - DICHLORO - ETHYL PHOSPHATE AND ITS APPLICATION AS A MULTIFUNCTIONAL PESTICIDE

Joseph Nils Ospenson, Concord, and Gustave K. Kohn, Oakland, Calif., assignors to California Research Corporation, San Francisco, Calif., a corporation of Delaware No Drawing. Filed Nov. 19, 1957, Ser. No. 697,334

5 Claims. (Cl. 167—22)

This invention relates to a particular chemical compound, namely, dimethyl-1,2-dibromo-2,2-dichloroethyl phosphate, and its unique characteristics in respect to its application as a pesticide.

Although the principal direction in the development of improved insecticides has been toward compounds of increased toxicity to insects, a universal corollary is the corresponding increase in mammalian toxicity. This is particularly evident in the field of insecticidal phosphorus compounds, with the notable exception of S-(1,2-dicarbethoxyethyl) O,O-dimethyl dithiophosphate (Malathion). However, even in the case of Malathion, the comparatively low mammalian toxicity is balanced by a corresponding decrease in insecticidal activity.

In contrast to normal expectations and as opposed to the weight of authority, an unusual phosphorus compound has now been discovered which unexpectedly combines a high degree of insecticidal activity with a low mammalian toxicity. Additionally, other unique pesticidal characteristics have been discovered to be associated with this compound which are of sufficient magnitude to permit its application as a multi-functional pesticide. These unique properties have been found characteristic of dimethyl - 1,2 - dibromo-2,2-dichloroethyl phosphate which exists as a white crystalline solid having a slightly pungent odor and a melting point of about 25.5°–26.5° C., a refractive index of 1.5108 at 28° C., and a specific gravity of 1.96 at 26° C.

This compound may be prepared by bromination of dimethyl-2,2-dichlorovinyl phosphate (DDVP) under critically controlled conditions. Previous attempts in the bromination of DDVP under standardized conditions employed in the determination of bromine number have resulted in a qualitative absorption of bromine sufficient to empirically qualify for the determination of an ethylenic bond but which has been determined to involve "an anomalous reaction" as distinguished from a normal bromine addition. The product of this anomalous reaction could not be isolated or identified (J. F. Allen et al., J.A.C.S., vol. 78, pages 3715–3718, August 5, 1956).

For the attainment of substantially quantitative yields of dimethyl-1,2-dibromo-2,2-dichloroethyl phosphate, it is preferred to react dimethyl-2,2-dichlorovinyl phosphate with bromine in the presence of an inert solvent and under photochemical catalysis while maintaining a free bromine content in the reaction mixture less than about 4% by weight and at a temperature in the range of 0°–30° C., following which the volatiles are stripped from the reaction system and a low-viscous product is recovered which crystallizes to a white crystalline solid.

Directionally, the viscosity of the reaction product has been found to be inversely proportionate to the yield of dimethyl-1,2-dibromo-2,2-dichloroethyl phosphate. A highly viscous product does not crystallize and is indicative of the so-called "anomalous reaction," resulting in negligible yields of the compound of the invention.

As indicated in the preferred method of preparation, the use of photochemical catalysis is necessary to obtain any appreciable yields of desired product. In comparative preparations, wherein all variables were held constant except for the presence or absence of light, the use of an ultraviolet light source in the bromination resulted in a 100% bromine addition and the recovery of 93 mole percent of the subject compound. In contrast, when the preparation was conducted in the absence of light, a 75% absorption of bromine was attained, from which a 10 mole percent yield of compound was recovered.

The rate of addition of bromine in the preparation materially affects the yield and purity of product compound. It was found that whenever the amount of free bromine in the reaction mixture exceeded 4% by weight of the total bromine added, a reduction in yield and purity consistently resulted.

The use of an inert aliphatic solvent is considered desirable to obtain optimum yields of product compound and directionally favoring a diminution of intramolecular side reactions, which presumably is a material factor in the anomalous reaction. While the preferred solvent is carbon tetrachloride, a number of inert polar solvents such as diethyl ether, acetic acid, chloroform, etc. have been used with satisfactory results.

The temperature variable of 0°–30° C. again was determined to result in optimum yields of pure bromine-addition compound. Experimentation below 0° has resulted in lower yields and purities, and temperatures materially above 30° are conducive to increasing undesirable side reactions.

As an illustration of the preferred method of preparation, the following example is presented.

Example

A 100-gallon Pfaudler kettle was equipped with turbine agitator and baffles and, in addition, equipment was available for the vacuum stripping of low-boiling materials. The kettle was jacketed so that cooling and heating could be applied when necessary. To the kettle were attached two L79A–11 450-watt Hanovia high-pressure quartz mercury vapor light sources, operating at about 200 volts within a water-cooled immersion well.

450 pounds of technical carbon tetrachloride and 272 pounds of technical dimethyl-2,2-dichlorovinyl phosphate (DDVP) were charged into the kettle. When the contents were under agitation and the lights turned on, 189 pounds of technical bromine were slowly added during a period of 10–11 hours. The rate of addition was adjusted and controlled, with periodic chlorimetric measurements, to a free bromine content in the mixture of less than 4% by weight. By the use of cooling, an average temperature of 12° C. was maintained (maximum variation, 6°–20° C.). Upon the addition of all of the bromine, the agitation was continued until the quantity of free bromine as measured by standardized chlorimetric methods was less than 2%.

The crude reaction product was then stripped under reduced pressure (50 millimeters' mercury) to a maximum temperature in the kettle of 80° C. Under these conditions, all of the solvent that could be vaporized was removed, as well as any excess bromine. The yield was substantially quantitative, and the resulting crystallized product had a purity of 90–93%.

The dimethyl-2,2-dichlorovinyl phosphate apparently is unique in respect to the difficulty of attaining the normal bromine addition. Under conventional bromination conditions, the homolog, diethyl-2,2-dichlorovinyl phosphate, undergoes a normal bromine addition to produce diethyl-1,2-dibromo-2,2-dichloroethyl phosphate which exists as a distillable, high-boiling liquid.

In spite of these distinguishing characteristics of dimethyl-1,2-dibromo-2,2-dichloroethyl phosphate, its principal uniqueness is evidenced by its unexpected characteristics as a multifunctional pesticide. As previously indicated, the subject compound combines a high degree of insecticidal activity with a low mammalian toxicity. This premise may be best illustrated by reference to its toxicity index or, in other words, the degree of danger to the applicator for equivalent insect control, which is defined as the following function:

$$\frac{LD_{85} \text{ insects (p.p.m.)}}{LD_{50} \text{ rats—oral (mg./kg.)}}$$

The toxicity index is determined and quoted with reference to a specific class of insects which are representative of the primary field of application of the insecticide. The following tabular data illustrate the position of the subject compound in respect to a representative group of economically important insecticidal phosphorus compounds and DDT.

The procedure by which the $LD_{85}$ values for flies are determined may be summarized as follows:

Female houseflies (*Musca domestica*) are anesthetized with $CO_2$ and triplicate series of 20 flies each are treated with $10^{-6}$ milliliters of acetone-toxicant solutions diluted to provide a range of 1000, 300, 100, 30 and 10 p.p.m. of toxicant. The flies are then placed in recovery cages for 24 hours at 80° F. The $LD_{85}$ is obtained by plotting the percent mortality for each replicated concentration on three-cycle logarithm probit paper.

In determining the $LD_{85}$ of mites, triplicate 0.5 millimeter disks of Lima bean (V. Henderson) leaves are infested each with 20 two-spotted mites (*Tetranychus bimaculatus*) and dipped in acetone-toxicant solution diluted to provide a range of 100, 30, 10, 3 and 1 p.p.m. of toxicant. The excess liquid is shaken off, and the leaves are placed on filter paper in standard Petri plates wherein they are dried with a mild stream of warm air and then covered for 24 hours at room temperature.

The $LD_{85}$ is obtained by plotting the percent mortality for each replicated concentration on two-cycle logarithm probit paper.

For the sake of convenience, the compound of the invention, namely, dimethyl-1,2-dibromo-2,2-dichloroethyl phosphate will be referred to in the following table as DBCP. The other test compounds will appear in their conventionally abbreviated or common designations. Thus, Dipterex is dimethyl-2,2,2-trichloro-1-hydroxyethyl phosphonate; TEPP is tetraethyl pyrophosphate; and Parathion is p-nitrophenyldiethyl thionophosphate.

proved this safening aspect without detraction and, in some areas, improvement in insecticidal activity. These unique properties in respect to the subject dibromo derivatives of DDVP do not extend to the corresponding dibromo derivatives of DDVP homologs since the diethyl-1,2-dibromo-2,2-dichloroethyl phosphate resulted in an oral $LD_{50}$ for the standard Long-Evans rats of 150 mg./kg.

In addition to this outstanding insecticidal activity, the subject compound has demonstrated effective fungitoxic activity in extensive tests against representative pathogenic fungi. The following tabular results indicate the data obtained in direct comparison with the parent DDVP and the chlorinated analog, dimethyl-1,2,2,2-tetrachloroethyl phosphate which is designated for convenience as DCCP.

These fungicidal data were obtained by a test procedure wherein filter paper disks were infused for 24 hours in a 60-hour old shake culture of the indicated fungi, namely, *Rhizoctonia solani*, *Sclerotinia sclerotiorum*, *Botrytis cinerea*, *Penicillium italicum*, *Sclerotinia fructicola*, and *Phytophthora cinnamomi*, after which they were transferred in triplicate to Petri dishes containing standard potato dextrose agar. These plates were placed on a turntable and sprayed with the test solution of the compounds dissolved in a 1:1 kerosene-acetone solvent in an Eastburg-McCaskey spray tower at 40 p.s.i. for 25 to 30 seconds. The exposed plates remained on the turntable for one minute after the spray application to allow the mist to settle. The plates were then incubated several days at optimum temperatures, after which the average radius of growth was measured with four measurements of each colony being made. The results obtained and tabulated in the following table represent the average degree of growth inhibition over the control culture sprayed only with the solvent.

| Compound | Conc., percent | R. solani | S. sclerotiorum | B. cinerea | P. italicum | S. fructicola | P. cinnamomi |
|---|---|---|---|---|---|---|---|
| DDVP | 0.25 | 7 | 9 | 1 | 6 | 0 | 2 |
| DCCP | 0.25 | 0 | 0 | 8 | 9 | 0 | 7 |
| DBCP | 0.25 | 95 | 100 | 91 | 86 | 81 | 99 |

In the application of the subject compound as a multifunctional pesticide, considerable variation in formulation may be employed. Thus, DBCP may be applied both as a liquid or as a component in a dust or wettable powder. In the preparation of liquid concentrates adaptable to aqueous field dilution, it is preferable to formulate DBCP in conjunction with emulsifying agents and hydrocarbon solvents, such as aliphatic solvents of high UR, or certain aromatic hydrocarbons, such as xylene. In the preparation of dust formulations, various combinations of solid inert carrier materials such as talc, limestone, gypsum, bentonite, and other inert solid diluents may be em-

| Compound | $LD_{50}$, Rats, Oral (mg./kg.) | $LD_{50}$, Rats, Dermal (mg./kg.) | $LD_{85}$, Mites (p.p.m.) | $LD_{85}$, Flies (p.p.m.) | Tox Index Mites $\times 10^2$ | Tox. Index Flies $\times 10^3$ |
|---|---|---|---|---|---|---|
| DBCP | 430 | 1,000+ | 5 | 21 | 1.1 | 4.8 |
| DDVP | 80 | 275 | 5 | 31 | 6.3 | 39.0 |
| Dipterex | 475 | | 26 | 700 | 5.5 | 147.0 |
| Parathion | 6 | | 3 | 30 | 50.0 | 500.0 |
| TEPP | 2 | | 85 | 285 | 4,250.0 | 14,250.0 |
| Malathion | 1,400 | | 30 | 500 | 2.1 | 36.0 |
| DDT | 250 | | not effective | 1,000 | | 400.0 |

On the basis of these data, it is quite evident that the subject compound is materially safer for practical application than Malathion for equivalent insect control. Additionally, while the parent compound, DDVP, is conventionally regarded as an outstanding insecticide per se, nevertheless the subject dibromo derivative has not only materially improved in mammalian toxicity, but has improved this safening aspect without detraction and, in ployed. Again, the solid formulations in the form of wettable powders involve the presence of suitable emulsifying and wetting agents in conjunction with the inert solid diluent.

A further characteristic of DBCP, which permits its ultimate application on edible crops close to harvest, is its lack of persistency or, in other words, the short residual effect of the pesticide as distinguished from the comparatively long residual action of DDVP. Additionally, the exceptionally low toxicity index of the subject compound permits its application in confined areas or areas in which animal or human contact cannot be easily avoided. Such critical areas are greenhouse application, dairy barn usage, and garden and home application.

Obviously, many modifications and variations of the invention as hereinbefore set forth may be made without departing from the spirit and scope thereof, and therefore only such limitations should be imposed as are indicated in the appended claims.

We claim:

1. Dimethyl-1,2-dibromo-2,2-dichloroethyl phosphate as a white crystalline solid with a melting point of 25.5–26.5° C.

2. The preparation of dimethyl-1,2-dibromo-2,2-dichloroethyl phosphate which comprises reacting dimethyl-2,2-dichlorovinyl phosphate with bromine in the presence of an inert aliphatic solvent and under photochemical catalysis while maintaining a free bromine content in the reaction mixture less than about 4% by weight and a temperature in the range of 0°–30° C., thereafter stripping the volatiles from the reaction system and recovering a low viscosity product which crystallizes to a white crystalline solid.

3. A multifunctional pesticidal composition comprising dimethyl-1,2-dibromo-2,2-dichloroethyl phosphate as an active toxicant component in conjunction with a pesticidally inert carrier.

4. A composition according to claim 3 which contains an emulsifying agent suitable for dispersing the composition in an aqueous medium.

5. A method of destroying pests which comprises contacting said pests with dimethyl-1,2-dibromo-2,2-dichloroethyl phosphate.

References Cited in the file of this patent

FOREIGN PATENTS 896,942   Germany _____ Nov. 16, 1953

OTHER REFERENCES

Allen et al.: J.A.C.S., vol. 78, pp. 3715–3718.
Barthel et al.: J.A.C.S., vol. 77, pp. 2424–2427.
Schwartz and Perry: Surface Active Agents, 1949, pp. 495–499.
Perkow et al.: Naturwissen Schaften, page 353, August 20, 1952.
Chem. Abstracts, vol. 49, 10834d, abstracting Chem. Berichte, 87, 755–8 (1954).
Mattson et al.: "J. Agr. Food Chem.," 3, 319–321 (1955).